(12) United States Patent
Brück et al.

(10) Patent No.: US 8,641,808 B2
(45) Date of Patent: Feb. 4, 2014

(54) METHOD AND APPARATUS FOR REDUCING SOOT PARTICLES IN THE EXHAUST GAS OF AN INTERNAL COMBUSTION ENGINE

(71) Applicant: EMITEC Gesellschaft für Emissionstechnologie mbH, Lohmar (DE)

(72) Inventors: Rolf Brück, Bergisch Gladbach (DE); Christian Vorsmann, Köln (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/765,874

(22) Filed: Feb. 13, 2013

(65) Prior Publication Data

US 2013/0145932 A1 Jun. 13, 2013

Related U.S. Application Data

(63) Continuation of application No. PCT/EP2011/063761, filed on Aug. 10, 2011.

(30) Foreign Application Priority Data

Aug. 13, 2010 (DE) .......................... 10 2010 034 251

(51) Int. Cl.
*B03C 3/12* (2006.01)
(52) U.S. Cl.
USPC ................ 96/68; 95/59; 95/78; 96/69; 96/74; 96/77; 96/88; 96/97
(58) Field of Classification Search
USPC ........ 96/74, 77–79, 88, 97, 68, 69, 98; 95/79, 95/59
See application file for complete search history.

(56) References Cited

U.S. PATENT DOCUMENTS 4,689,056 A * 8/1987 Noguchi et al. ................... 96/79
5,695,549 A * 12/1997 Feldman et al. ................... 96/55

(Continued)

FOREIGN PATENT DOCUMENTS

DE 10018851 A1 10/2001
DE 69427586 T2 4/2002

(Continued)

OTHER PUBLICATIONS

International Search Report of PCT/EP2011/063761, (Nov. 4, 2011).

*Primary Examiner* — Richard L Chiesa
(74) *Attorney, Agent, or Firm* — Laurence A. Greenberg; Werner H. Stemer; Ralph E. Locher

(57) ABSTRACT

An apparatus for reducing soot particles in exhaust gas, particularly of an internal combustion engine, includes first and second at least partially electrically conductive structures with an intermediate space therebetween, a high voltage source forming a potential between the first and second structures and at least one at least partially electrically conductive intermediate structure in the intermediate space receiving an intermediate potential. A method for treating the exhaust gas includes conducting exhaust gas from the first to the second structure and applying a high voltage at least temporarily between the first and second structures. At least part of the soot particles in the exhaust gas is ionized or agglomerated and deposited on the second structure. A high voltage between potentials of the first and second structures is applied at least temporarily to the intermediate structure. An electric field is influenced favorably and disruptions from undesirable voltage flashovers are reduced.

10 Claims, 1 Drawing Sheet

(56) References Cited

U.S. PATENT DOCUMENTS

| | | | |
|---|---|---|---|
| 5,733,360 A * | 3/1998 | Feldman et al. | 95/78 |
| 5,787,704 A | 8/1998 | Cravero | |
| 6,162,285 A * | 12/2000 | Fong et al. | 96/66 |
| 6,635,106 B2 * | 10/2003 | Katou et al. | 96/67 |
| 7,163,572 B1 * | 1/2007 | Liang et al. | 96/63 |
| 7,361,207 B1 * | 4/2008 | Coffey et al. | 95/78 |
| 7,863,540 B2 | 1/2011 | Masuda et al. | |
| 2002/0134665 A1 * | 9/2002 | Taylor et al. | 204/164 |
| 2005/0063879 A1 | 3/2005 | Tsuji | |
| 2006/0016336 A1 * | 1/2006 | Taylor et al. | 96/25 |
| 2007/0095211 A1 * | 5/2007 | Lee et al. | 96/66 |
| 2007/0137480 A1 * | 6/2007 | Bergeron et al. | 95/79 |
| 2008/0072574 A1 * | 3/2008 | Masuda et al. | 60/275 |
| 2008/0156186 A1 * | 7/2008 | McKinney | 95/2 |
| 2009/0007544 A1 | 1/2009 | Bruck | |

FOREIGN PATENT DOCUMENTS

| | | | |
|---|---|---|---|
| DE | 102004044731 A1 | 5/2005 | |
| DE | 102006001831 A1 | 9/2007 | |
| EP | 1 840 938 A1 | 10/2007 | |
| JP | 52-33173 A * | 3/1977 | 96/77 |
| JP | 2003172123 A | 6/2003 | |

* cited by examiner

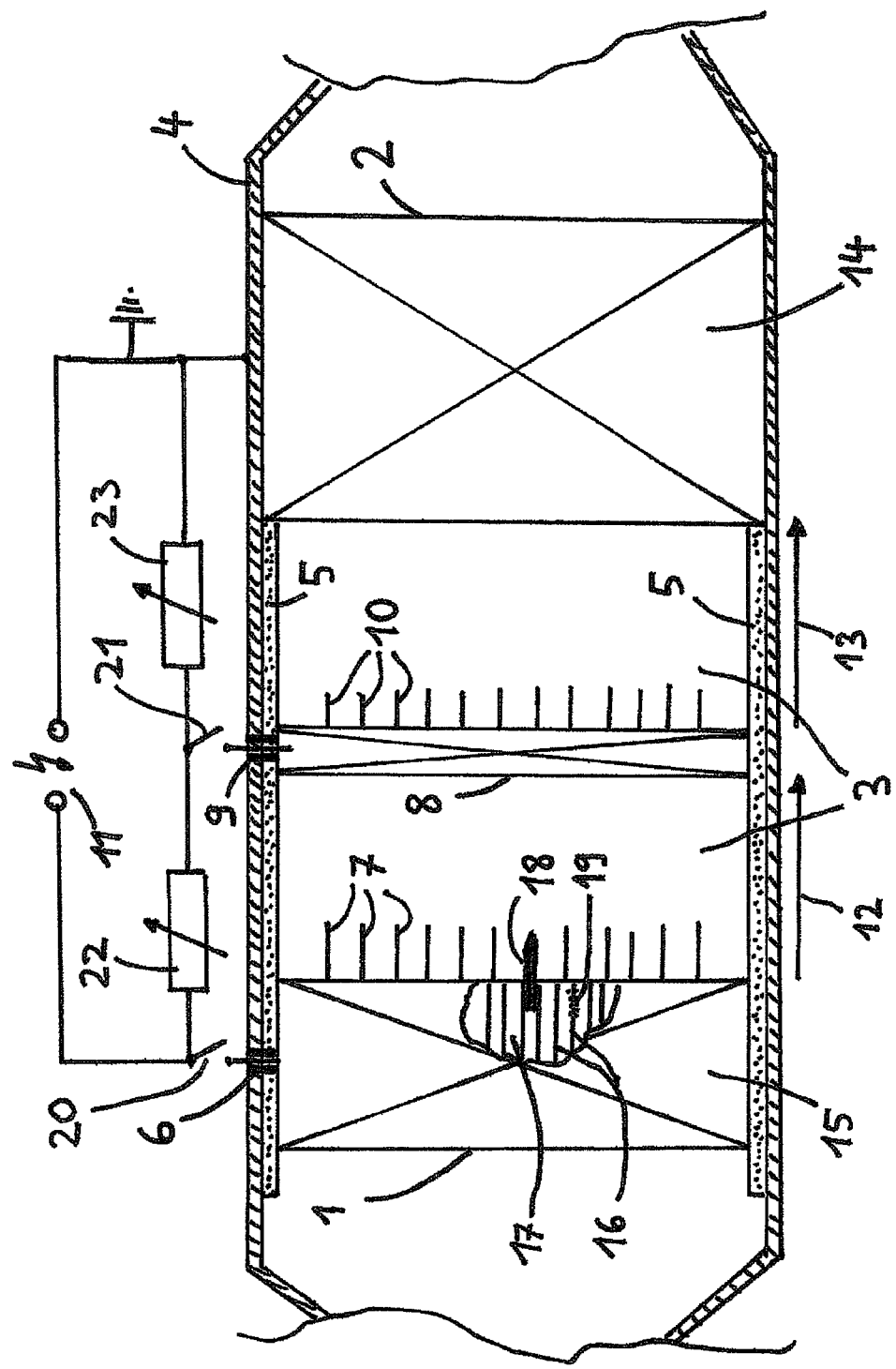

METHOD AND APPARATUS FOR REDUCING SOOT PARTICLES IN THE EXHAUST GAS OF AN INTERNAL COMBUSTION ENGINE

CROSS-REFERENCE TO RELATED APPLICATION

This application is a continuation, under 35 U.S.C. §120, of copending International Application No. PCT/EP2011/063761, filed Aug. 10, 2011, which designated the United States; this application also claims the priority, under 35 U.S.C. §119, of German Patent Application DE 10 2010 034 251.3, filed Aug. 13, 2010; the prior applications are herewith incorporated by reference in their entirety.

BACKGROUND OF THE INVENTION

Field of the Invention

The present invention relates to a method and an apparatus for reducing soot particles in the exhaust gas of an internal combustion engine.

Internal combustion engines, which are operated with hydrocarbons as fuel, emit an exhaust gas, which also contains carbonaceous particles, among others. Those carbonaceous particles are of different sizes, the distribution of which depends on many conditions. In particular, carbonaceous particles of small diameter, which are also referred to as fine particles, are thought to be responsible for human and animal illnesses. In that case, fine particles are understood, in particular, to mean particles of which the average diameter is 100 nanometers or less. Carbonaceous particles, in particular, also include carbon particles possibly with accumulated hydrocarbons.

In order to reduce particle emissions, in particular in motor vehicles, "closed particle filters" are often used, in which exhaust gas flows through a structure that includes alternately closed channels and porous walls between the channels. So as to ensure a minimal counter-pressure of the particle filter, even when already charged, porosities have to be used that particularly allow the fine particles to pass in a manner in which they are still substantially unfiltered.

It is also known that an agglomeration of small soot particles so as to form larger soot particles and/or an electrical charging of soot particles may be caused by the provision of an electric field and/or a plasma. Electrically charged soot particles and/or larger soot particles are generally much easier to separate in a filter system. Soot particle agglomerates are transported in an exhaust gas flow carrier more inertially due to their greater inertia and thus deposit more easily at deflection points of an exhaust gas flow. Electrically charged soot particles are drawn due to their charge toward oppositely charged surfaces, at which they accumulate and release their charge. That also facilitates the removal of soot particles from the exhaust gas flow during operation of motor vehicles having different filter or separation devices.

The efficacy of an electric field for the described approaches depends, inter alia, on the field strength, the homogeneity of the electric field in the effective area, and its reproducibility over long periods of time. The higher the applied voltages, the higher is the efficacy, although the difficulties encountered with regard to insulation, the avoidance of short circuits and undesired voltage sparkovers also increase. That is true to a greater or lesser extent for all known configurations of the electric field in an exhaust gas purification system. In addition, in the event of a short circuit or a voltage sparkover (also referred to as electric arcing), the electric field may break down, at least temporarily, and therefore the function of the system is not ensured during such periods.

SUMMARY OF THE INVENTION

It is accordingly an object of the invention to provide a method and an apparatus for reducing soot particles in the exhaust gas of an internal combustion engine, which overcome the hereinafore-mentioned disadvantages and at least partially solve the highlighted problems of the heretofore-known methods and apparatuses of this general type and, in particular, to disclose an improved apparatus for generating an electric field for a mobile exhaust gas treatment system and a method for treating an exhaust gas.

With the foregoing and other objects in view there is provided, in accordance with the invention, an apparatus for reducing soot particles in an exhaust gas, in particular in an exhaust gas of an internal combustion engine. The apparatus comprises at least a first at least partially electrically conductive structure, a second at least partially electrically conductive structure, an intermediate space between the first structure and the second structure, a high-voltage source for creating an electric potential between the first structure and the second structure, and at least one at least partially electrically conductive intermediate structure disposed in the intermediate space and on which an intermediate potential can be created.

The electrically conductive intermediate structure makes it possible, as a result of its shape and/or its potential, to influence the electric field in the intermediate space. This intermediate structure can thus be used to make the electric field as homogeneous as possible or to structure the electric field between the first structure and the second structure inhomogeneously. In the simplest case, the intermediate structure can be disposed centrally in the intermediate space and can obtain a potential in the middle between the potentials of the first structure and the second structure. This leads to homogenization of the electric field, which is advantageous for some applications. The intermediate structure may also be used, however, to make the electric field inhomogeneous, both in the direction of flow of an exhaust gas and also perpendicular thereto, that is to say in a radial direction. Since an exhaust gas flow in a housing is by no means homogeneous, the shape of the electric field can thus be adapted to the flow conditions as required, for example it can be concentrated toward the center of the flow.

In an advantageous development of the invention, the first structure, the intermediate structure and the second structure are disposed in succession in the direction of flow of the exhaust gas so that exhaust gas can flow successively through the structures. The structures can thus be adapted to the respective flow situation currently prevailing. The structures can also be adapted, however, in such a way that they can influence the flow individually.

The exhaust gas can preferably flow through the first structure, the second structure and also the intermediate structure. In this regard, the first structure, the second structure and the intermediate structure particularly preferably completely cover the exhaust gas flow in cross section, so that the entire exhaust gas flow can flow fully in particular through each of the individual structures in succession.

In accordance with another preferred feature of the invention, at least one of the structures has a plurality of channels through which an exhaust gas can flow, wherein a construction in the form of a honeycomb body is possible, in particular. Honeycomb bodies have already been proposed in the prior art in the form of a first structure and a second structure, wherein the second structure, in particular, can be formed as a particle trap. Many embodiments of honeycomb bodies formed as particle traps are known in the prior art and can also be used as a second structure for the present invention, provided they are at least partially electrically conductive. In particular, honeycomb bodies formed from sheet metal layers with channels through which an exhaust gas can flow, as are likewise known in abundance in the prior art, may be considered for the first structure and the intermediate structure.

In accordance with a further feature of the invention, at least the first structure particularly preferably has a plurality of channels through which an exhaust gas can flow, wherein the first structure and the intermediate structure, in particular, have channels through which an exhaust gas can flow. Alternatively, the first structure and the second structure particularly preferably have a plurality of channels through which an exhaust gas can flow. In a further embodiment, all structures may also have a plurality of channels through which an exhaust gas can flow.

In accordance with an added feature of the invention, either all of the structures or some of the structures may preferably be provided with a catalytically active coating, either completely or in part. In particular, honeycomb bodies having catalytic coatings, which are used in typical exhaust gas purification systems of motor vehicles, can be considered for the first and second structure. By contrast, the intermediate structure generally does not provide a large surface, but is formed as a disk that is short in the direction of flow, and therefore a catalytically active coating is less significant. The intermediate structure can also be formed as a wire grating or as a meandering wire.

Typical configurations for ionization in an exhaust gas, as are described herein, have electrodes in the electric field with high electric fields occurring at the tips of the electrodes, which promotes the detachment of electrons and therefore ionization. In accordance with an additional feature of the invention, the first structure preferably also has a first group of electrodes, which are shaped and aligned to form point discharges. The intermediate structure particularly preferably also has a second group of electrodes, wherein all electrodes are shaped and aligned in such a way that the point discharges can be generated when a high voltage is applied between the first structure and the intermediate structure or between the intermediate structure and the second structure. When using a plurality of intermediate structures, entire series of electrode groups can thus be disposed in the exhaust gas, which promotes uniform ionization.

In accordance with yet another feature of the invention, the first structure and the at least one intermediate structure are preferably disposed in a housing in an electrically insulated manner and are connected by electrically insulated bushings to the high-voltage source. An electrical insulation inside the housing in the region of the intermediate space prevents undesired deformations of the electric field and voltage sparkovers between the structures and the housing. The high-voltage source is particularly preferably equipped with one or more voltage dividers, wherein selective disconnection of the first structure or of the intermediate structure from the high-voltage source is enabled by switches.

In accordance with yet a further feature of the invention, at least two intermediate structures disposed at a distance from one another are provided in the intermediate space, which enables the electric field to be shaped in a manner that can be even better adapted to different applications.

With the objects of the invention in view, there is also provided a method for treating an exhaust gas containing soot particles, in particular by using an apparatus according to the invention as described above. The method comprises conducting an exhaust gas flow from a first structure to a second structure and applying a high voltage, at least temporarily or from time to time, between the first structure and the second structure so that at least some of the soot particles in the exhaust gas are ionized or agglomerated and are deposited on the second structure. In accordance with the invention, a high voltage is applied, at least temporarily or from time to time, to an intermediate structure that is disposed in an intermediate space between the first structure and the second structure. The high voltage has a value between the potentials of the first and second structures. The axial and/or radial profile of the electric field between the first and second structures is thus influenced, in such a way that field profiles favorable for any application can be generated.

In accordance with a concomitant mode of the invention, there is an option of varying the potential of the intermediate structure and thus adapting it to different operating conditions. Even regeneration of soiled or irregularly burned electrodes of the first structure is thus possible. When a plurality of intermediate structures having their own groups of electrodes is provided, they can also be operated differently by varying the voltage applied at each of the intermediate structures. When using a relatively high total voltage between the first and second structures, for example 10 kV (kilovolts), the voltage can be divided by intermediate structures in such a way that, even if individual voltage sparkovers occur, the rest of the system maintains the exhaust gas purification.

Other features which are considered as characteristic for the invention are set forth in the appended claims, noting that the features disclosed individually in the claims can also be combined with one another in any technically feasible manner and can be supplemented by explanatory substantive matter from the description, in which further variants of the invention are presented.

Although the invention is illustrated and described herein as embodied in a method and an apparatus for reducing soot particles in the exhaust gas of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a fragmentary, diagrammatic, longitudinal-sectional view showing the construction of an apparatus according to the invention with an intermediate structure.

DETAILED DESCRIPTION OF THE INVENTION

Referring now in detail to the single FIGURE of the drawing, there is seen a first structure 1 and a second structure 2 defining an intermediate space 3 in a housing 4. In the present exemplary embodiment, the second structure 2 is electrically connected to the housing 4 and forms a reference potential, which is also referred to as ground. An electrical insulation 5 separates the first structure 1 from the housing 4 and also extends over the entire intermediate space 3 at the inner side or surface of the housing 4. The first structure 1 can be connected through a first bushing 6 to a high-voltage source 11 so that a positive or negative high voltage, for example 2.5 to 25 kV, preferably 5 to 15 kV, can be applied to the first structure. The first structure 1 is equipped with a first group of electrodes 7 which lead to point discharges in the intermediate space 3 that promote ionization of an exhaust gas to be purified, when a high voltage is applied. The freed electrons are accelerated into the intermediate space 3 by an applied electric field, which leads to ionization of atoms or molecules of the exhaust gas to be purified. An intermediate structure 8 is disposed in the intermediate space 3, likewise is electrically insulated from the housing 4 and likewise can be exposed to a high voltage through a second bushing 9. The following embodiments are also valid or effective analogously with the application of two or more intermediate structures.

The high-voltage source 11 is equipped with a voltage divider which, in the simplest case, is formed schematically of a first resistor 22 and a second resistor 23. Switches 20, 21 enable selective disconnection of the first structure 1 or the intermediate structure 8 from the high-voltage source 11. A first partial voltage 12 drops across the first resistor 22 and a second partial voltage 13 drops across the second resistor 23. If the first resistor 22 and/or the second resistor 23 are controllable, as indicated in the drawing, the division of the total voltage of the high-voltage source 11 between the first partial voltage 12 and the second partial voltage 13 can be varied and set to a desired value. In the simplest case, a more homogeneous distribution of the electric field in the intermediate space 3 is thus achieved, for example if the intermediate structure 8 is located exactly in the middle between the first structure 1 and the second structure 2 and the intermediate structure 8 is also set with a voltage in the middle between the potential of the first structure 1 and that of the second structure 2. It is also possible, however, to increase the electric field in the vicinity of the first structure 1 and the first group of electrodes 7 by selecting a potential for the intermediate structure 8 closer to the potential of the second structure 2.

In the illustrated exemplary embodiment, the intermediate structure 8 carries a second group of electrodes 10 so that, with a suitable selection of the first partial voltage 12 and of the second partial voltage 13, two groups of point discharges are provided in the exhaust gas to be purified. This provides different advantageous possibilities for adapting the apparatus to different operating conditions and requirements.

The second structure 2 is typically formed as a filter body 14 and is used to separate soot particles that have been ionized and/or agglomerated in the intermediate space 3. A catalytically active coating assists the conversion of the soot particles and the regeneration of the filter body 14. The first structure 1 is typically embodied as a metal honeycomb body 15 formed from structured sheet metal layers 16 with pin electrodes 18 fixed therein. It can also be provided with a catalytically active coating 19. At least one of the structures 1, 2, 8 has a plurality of channels 17 through which an exhaust gas can flow.

The present invention enables uniform exhaust gas purification that can be adapted to different operating conditions with low susceptibility to failure with the use of ionizing high voltages.

The invention claimed is:

1. An apparatus for reducing soot particles in an exhaust gas, the apparatus comprising:
a first at least partially electrically conductive structure, said first structure having a first group of electrodes;
a second at least partially electrically conductive structure;
said first structure and said second structure defining an intermediate space therebetween;
a high-voltage source configured to create an electric potential between said first structure and said second structure; and
at least one at least partially electrically conductive intermediate structure on which an intermediate potential can be created, said at least one intermediate structure disposed in said intermediate space, said at least one intermediate structure having a second group of electrodes;
at least one of said structures being formed as a honeycomb body;
said electrodes of each group being shaped and aligned for generating point discharges when a high voltage is applied between said first structure and said intermediate structure or between said intermediate structure and said second structure.

2. The apparatus according to claim 1, wherein the apparatus is configured to reduce soot particles in an exhaust gas from an internal combustion engine.

3. The apparatus according to claim 1, wherein at least one of said structures has a plurality of channels through which the exhaust gas can flow.

4. The apparatus according to claim 1, which further comprises a catalytically active coating applied to at least part of at least one of said structures.

5. The apparatus according to claim 1, which further comprises:
a housing in which said first structure and said at least one intermediate structure are disposed in an electrically insulated manner; and
electrically insulated bushings connecting said first structure and said at least one intermediate structure to said high-voltage source.

6. The apparatus according to claim 1, which further comprises switches configured to enable selective disconnection of said first structure or said intermediate structure from said high-voltage source.

7. The apparatus according to claim 1, wherein said at least one intermediate structure includes at least two intermediate structures disposed at a distance from one another in said intermediate space.

8. A method for treating an exhaust gas having soot particles, the method comprising the following steps:
providing an apparatus according to claim 1;
conducting a flow of the exhaust gas from the first structure to the second structure;
applying high voltage, at least temporarily, between the first structure and the second structure ionizing or agglomerating and depositing at least some of the soot particles in the exhaust gas on the second structure;
applying high voltage, at least temporarily, to the intermediate structure; and
providing the high voltage at a value between potentials of the first and second structures.

9. The method according to claim 8, which further comprises treating the exhaust gas having the soot particles by using the apparatus according to claim 1.

10. The method according to claim 8, which further comprises varying a potential of the intermediate structure.

* * * * *